United States Patent
Yu et al.

(10) Patent No.: US 12,184,366 B2
(45) Date of Patent: Dec. 31, 2024

(54) PACKET SENDING METHOD, INTELLIGENT TERMINAL, AND STORAGE MEDIUM

(71) Applicant: Ruijie Networks Co., Ltd., Fuzhou (CN)

(72) Inventors: Chenglong Yu, Fujian (CN); Longshun Wang, Fujian (CN)

(73) Assignee: Ruijie Networks Co., Ltd., Fuzhou (CN)

( * ) Notice: Subject to any disclaimer, the term of this patent is extended or adjusted under 35 U.S.C. 154(b) by 0 days.

(21) Appl. No.: 18/736,649

(22) Filed: Jun. 7, 2024

(65) Prior Publication Data

US 2024/0322872 A1    Sep. 26, 2024

Related U.S. Application Data

(63) Continuation of application No. PCT/CN2022/139381, filed on Dec. 15, 2022.

(30) Foreign Application Priority Data

Dec. 17, 2021 (CN) .......................... 202111552918.3

(51) Int. Cl.
*H04B 7/06* (2006.01)
*H04B 7/08* (2006.01)
*H04L 47/62* (2022.01)

(52) U.S. Cl.
CPC ......... *H04B 7/0602* (2013.01); *H04B 7/0608* (2013.01); *H04B 7/08* (2013.01); *H04L 47/62* (2013.01)

(58) Field of Classification Search
CPC ...... H04B 7/0602; H04B 7/0608; H04B 7/08; H04L 47/62
See application file for complete search history.

(56) References Cited

U.S. PATENT DOCUMENTS 6,445,688 B1 * 9/2002 Garces .................. H04W 40/06
                                                        370/465
10,855,351 B1 * 12/2020 Tsai ....................... H04B 7/063
(Continued)

FOREIGN PATENT DOCUMENTS

CN        102905364 A        1/2013
CN        108282415 A        7/2018
(Continued)

OTHER PUBLICATIONS

International Search Report received for PCT Patent Application No. PCT/CN2022/139381, mailed on Mar. 3, 2023, 5 pages (2 pages of English Translation and 3 pages of Original Document).
(Continued)

*Primary Examiner* — Redentor Pasia
(74) *Attorney, Agent, or Firm* — ArentFox Schiff LLP; Michael Fainberg

(57) ABSTRACT

Embodiments of this application provide a packet sending method and an intelligent terminal, and a storage medium. The method is applied to an intelligent terminal provided with a plurality of wireless antennas comprising at least one directional antenna, and the method includes: obtaining a destination MAC address of a to-be-sent packet; determining, based on a mapping relationship between a MAC address and a wireless antenna, a target wireless antenna corresponding to the destination MAC address, where the mapping relationship is configured based on an orientation relationship between the intelligent terminal and different neighboring devices, the different neighboring devices include other intelligent terminals and/or a management device, the management device is configured to store data collected by each intelligent terminal, and the target wireless antenna is one of the at least one directional antenna; and
(Continued)

sending the to-be-sent packet by using the target wireless antenna.

17 Claims, 6 Drawing Sheets

(56) References Cited

U.S. PATENT DOCUMENTS

| | | | | |
|---|---|---|---|---|
| 2015/0111502 A1* | 4/2015 | Sofer | .................. | H04B 7/0695 |
| | | | | 455/63.4 |
| 2015/0289247 A1* | 10/2015 | Liu | ...................... | H04B 7/0632 |
| | | | | 370/329 |
| 2016/0057056 A1* | 2/2016 | Gasparakis | ............. | H04L 45/74 |
| | | | | 370/392 |
| 2016/0352409 A1* | 12/2016 | Chuang | ................ | H04B 7/0691 |
| 2018/0006688 A1* | 1/2018 | Cariou | .................. | H04L 69/322 |
| 2020/0011958 A1* | 1/2020 | Hashisho | .............. | G01S 5/0063 |
| 2021/0297344 A1* | 9/2021 | He | ........................ | H04L 61/103 |

FOREIGN PATENT DOCUMENTS

| | | |
|---|---|---|
| CN | 108934020 A | 12/2018 |
| CN | 111541506 A | 8/2020 |
| CN | 111629389 A | 9/2020 |
| CN | 111757484 A | 10/2020 |
| CN | 114257282 A | 3/2022 |
| WO | 2019/179384 A1 | 9/2019 |

OTHER PUBLICATIONS

Office Action received for Chinese Patent Application No. 202111552918.3, mailed on Jan. 22, 2024, 6 pages (Original Document only).

* cited by examiner

| Mapping relationship table between a MAC address and a wireless antenna in P1 ||
|---|---|
| MAC address | Wireless antenna |
| MAC 0 (P2) | Directional antenna, with an angle of 0 degrees |
| MAC 1 (P3) | Directional antenna, with an angle of 90 degrees |
| MAC 2 (storage device 1) | Directional antenna, with an angle of 180 degrees |
| MAC 3 (storage device 2) | Directional antenna, with an angle of 90 degrees |

FIG. 3

| Mapping relationship table between a MAC address and a wireless antenna in P1 ||||
|---|---|---|---|
| Packet type | MAC address | Packet queue | Wireless antenna |
| Unicast packet | MAC 0 (P2) | Q0 | Directional antenna, with an angle of 0 degrees |
| | MAC 1 (P3) | Q1 | Directional antenna, with an angle of 90 degrees |
| | MAC 2 (storage device 1) | Q2 | Directional antenna, with an angle of 180 degrees |
| | MAC 3 (storage device 2) | Q1 | Directional antenna, with an angle of 90 degrees |
| Broadcast packet | | Q3 | Omnidirectional antenna |

FIG. 4

| Packet queue scheduling time sequence table |||
|---|---|---|
| Queue scheduling sequence | Packet queue | Scheduling time (quantity of time slices) |
| 1 | Q0 | 1 |
| 2 | Q2 | 1 |
| 3 | Q1 | 3 |
| 4 | Q0 | 2 |
| 5 | Q3 | 1 |

FIG. 5

| Correspondence between a queue identifier and a time slice index value |||||||||||||||||
|---|---|---|---|---|---|---|---|---|---|---|---|---|---|---|---|---|
| Queue scheduling period | First period |||||||| Second period |||||||| ... |
| Identifier of a scheduled queue | Q0 | Q2 | Q1 | Q1 | Q1 | Q0 | Q0 | Q3 | Q0 | Q2 | Q1 | Q1 | Q1 | Q0 | Q0 | Q3 | ... |
| Time slice index value | 0 | 1 | 2 | 3 | 4 | 5 | 6 | 7 | 0 | 1 | 2 | 3 | 4 | 5 | 6 | 7 | ... |

FIG. 6

PACKET SENDING METHOD, INTELLIGENT TERMINAL, AND STORAGE MEDIUM

CROSS-REFERENCE TO RELATED APPLICATIONS

This application is a continuation of International Patent Application No. PCT/CN2022/139381, filed on Dec. 15, 2022, and entitled "PACKET SENDING METHOD AND APPARATUS, INTELLIGENT TERMINAL AND STORAGE MEDIUM", which claims priority to Chinese Patent Application No. 202111552918.3, filed with the China National Intellectual Property Administration on Dec. 17, 2021 and entitled "PACKET SENDING METHOD AND APPARATUS, INTELLIGENT TERMINAL, AND STORAGE MEDIUM", both of which are incorporated herein by reference in their entireties.

TECHNICAL FIELD

This application relates to the field of wireless communication technologies, and in particular, to a packet sending method, an intelligent terminal, and a storage medium.

BACKGROUND

With development of wireless communication technologies, data transmission through wireless network devices can effectively resolve problems such as difficult line deployment and high construction costs when data is transmitted by using a wired Ethernet.

For a wireless network device, strength of a signal in data transmission is crucial for whether data can be transmitted successfully. When the strength of the transmitting signal is sufficiently high, the data can be transmitted efficiently and accurately. However, when there is a long distance between wireless network devices or there is impact from an obstruction, resulting in great attenuation of the transmitting signal and low strength of the transmitting signal, the data may not be transmitted normally. For example, when an IP Camera (IPC) transmits video data to a video-on-demand device or a storage device, it is assumed that the following scenario exists: In a scenario, a plurality of IPC devices are deployed, each IPC device is provided with a Wi-Fi module, and the IPC device may act as a relay node to forward packets for other IPC devices. However, due to obstructions or other reasons, no packet may be received, resulting in failure of video data transmission. Therefore, an urgent problem to be resolved is to provide a reliable wireless transmission solution.

SUMMARY

Embodiments of this application provide a packet sending method and apparatus, an intelligent terminal, and a storage medium to improve signal quality in wireless transmission and improve stability of wireless transmission.

According to a first aspect, A packet sending method, applied to an intelligent terminal provided with a plurality of wireless antennas comprising at least one directional antenna, the method including:
obtaining a destination MAC address of a to-be-sent packet;
determining, based on a mapping relationship between the destination MAC address and a wireless antenna from the at least one directional antenna, the wireless antenna as a target wireless antenna, wherein the mapping relationship is configured based on an orientation relationship between the intelligent terminal and one of neighboring devices of the intelligent terminal; and
sending the to-be-sent packet by using the target wireless antenna;
where the determining, based on the mapping relationship between the destination MAC address and the wireless antenna, the wireless antenna as the target wireless antenna, comprises:
determining, based on a preset first mapping relationship between the destination MAC address, a packet type, and a queue, the queue as a target queue corresponding to the destination MAC address;
storing the to-be-sent packet in the target queue; and
when the target queue meets a scheduling condition, determining, based on a preset second mapping relationship between the target queue and the wireless antenna, the wireless antenna as the target wireless antenna corresponding to the target queue, wherein the mapping relationship comprises the first mapping relationship and the second mapping relationship.

Optionally, where the plurality of wireless antennas further comprises an omnidirectional antenna, the method further includes:
when the mapping relationship corresponding to the destination MAC address does not exist, determining the omnidirectional antenna as the target wireless antenna, for broadcasting the to-be-sent packet.

Optionally, where after the sending the to-be-sent packet by using the target wireless antenna, the method further comprises:
receiving, by using a target directional antenna from the plurality of wireless antennas, a broadcast response packet transmitted by a target device from the neighboring devices, wherein the destination MAC address is a MAC address of the target device; and
establishing, based on the broadcast response packet, a mapping relationship between the destination MAC address and the target directional antenna.

Optionally, the plurality of wireless antennas further comprises an omnidirectional antenna, and the mapping relationship indicates a correspondence between a packet type, the destination MAC address, and the target wireless antenna; and
the determining, based on the known mapping relationship between the destination MAC address and the wireless antenna, the wireless antenna as the target wireless antenna corresponding to the destination MAC address includes:
in response to the to-be-sent packet being a broadcast packet, determining the omnidirectional antenna as the target wireless antenna; or
in response to the to-be-sent packet being a unicast packet, determining the wireless antenna corresponding to the destination MAC address as the target wireless antenna.

Optionally, before the when the target queue meets the scheduling condition, determining, based on the preset second mapping relationship between the target queue and the wireless antenna, the wireless antenna as the target wireless antenna corresponding to the target queue, the method further includes:
determining, based on a result of a modulo operation between an instant of generating a current timing signal and a specified scheduling period, a target time slice index value for the current timing signal, wherein the timing signal is generated at an interval of a preset time slice length, a length of the scheduling period is an integer multiple of the preset time slice length, and a quantity of queues transmitted in the scheduling period is less than or equal to a quantity of time slices comprised in the scheduling period;

determining, based on a preset correspondence between a queue identifier of a queue and the time slice index value in the scheduling period, the queue corresponding to the target time slice index value; and when the determined queue is the target queue, determining that the target queue meets the scheduling condition.

Optionally, the method further includes:

obtaining arrangement information of the intelligent terminal and the one of the neighboring devices, where the arrangement information is used to identify a packet sender and a packet receiver corresponding to each slot, and the packet sender and the packet receiver are respectively one of the intelligent terminal and the one of the neighboring devices; and when the one of the neighboring devices corresponding to the destination MAC address is the packet receiver and the intelligent terminal is the packet sender, determining, based on the arrangement information, that the target queue meets the scheduling condition.

Optionally, the neighboring devices comprise other intelligent terminals and/or a management device, the management device is configured to store data collected by the intelligent terminal and/or the other intelligent terminals, and the wireless antenna is one of the at least one directional antenna.

According to a second aspect, an embodiment of this application provides a packet receiving method, applied to an intelligent terminal provided with a plurality of wireless antennas comprising at least one directional antenna, the method comprising:

obtaining a MAC address of a packet sender;

determining, based on a mapping relationship between the destination MAC address and a wireless antenna from the at least one directional antenna, the wireless antenna as a target wireless antenna, wherein the mapping relationship is configured based on an orientation relationship between the intelligent terminal and one of neighboring devices of the intelligent terminal; and receiving, by using the target wireless antenna, a packet sent by the packet sender;

wherein the determining, based on the mapping relationship between the MAC address and the wireless antenna, the wireless antenna as the target wireless antenna, comprises:

determining, based on a preset third mapping relationship between the MAC address and a receiving queue, a target receiving queue corresponding to the MAC address; and when the target receiving queue meets a scheduling condition, determining, based on a preset fourth mapping relationship between the receiving queue and the wireless antenna, the target wireless antenna corresponding to the target receiving queue, wherein the mapping relationship comprises the third mapping relationship and the fourth mapping relationship.

Optionally, where the plurality of wireless antennas further comprises an omnidirectional antenna, the method further includes:

when the mapping relationship corresponding to the MAC address does not exists, determining the omnidirectional antenna as the target wireless antenna for receiving the packet sent by the packet sender.

Optionally, after the receiving, by using the target wireless antenna, a packet sent by the packet sender, the method further includes:

feeding back a response packet to the packet sender by using a target directional antenna, wherein the packet sender is one of the neighboring devices, and the target directional antenna is one of the at least one directional antenna; and establishing a mapping relationship between the MAC address and the target directional antenna.

Optionally, before when the target receiving queue meets a scheduling condition, determining, based on a preset fourth mapping relationship between the receiving queue and the wireless antenna, the target wireless antenna corresponding to the target receiving queue, the method further includes:

determining, based on a result of a modulo operation between an instant of generating a current timing signal and a specified scheduling period, a target time slice index value for the current timing signal, wherein the timing signal is generated at an interval of a preset time slice length, a length of the scheduling period is an integer multiple of the preset time slice length, and a quantity of queues transmitted in the scheduling period is less than or equal to a quantity of time slices comprised in the scheduling period;

determining, based on a preset correspondence between a queue identifier of a queue and the time slice index value in the scheduling period, the queue corresponding to the target time slice index value; and when the determined queue is the target receiving queue, determining that the target receiving queue meets the scheduling condition.

Optionally, the method further includes:

obtaining arrangement information of the intelligent terminal and the one of the neighboring devices, where the arrangement information is used to identify a packet sender and a packet receiver corresponding to each slot, and the packet sender and the packet receiver are respectively one of the intelligent terminal and the one of neighboring devices; and when one of the neighboring devices corresponding to the MAC address is the packet sender and the intelligent terminal is the packet receiver, determining, based on the arrangement information, that the target receiving queue meets the scheduling condition.

Optionally, the neighboring devices comprise other intelligent terminals and/or a management device, the management device is configured to store data collected by the intelligent terminal and/or the other intelligent terminals, and the wireless antenna is one of the at least one directional antenna.

According to a third aspect, an embodiment of this application provides an intelligent terminal, including a memory, a processor, a communication interface, an omnidirectional antenna, and at least one directional antenna, where the memory stores executable code, and when the executable code is executed by the processor, the processor is enabled to perform the packet sending method according to the first aspect or the packet receiving method according to the second aspect.

According to a fourth aspect, an embodiment of this application further provides a non-transitory machine-readable storage medium, where the non-transitory machine-readable storage medium stores executable code, and when the executable code is executed by a processor of an electronic device, the processor may be enabled to implement at least the packet sending method according to the first aspect or the packet receiving method according to the second aspect.

A packet sending solution provided in the embodiments of this application is applied to an intelligent terminal having a wireless communication function, where the intelligent terminal is provided with a plurality of wireless antennas including an omnidirectional antenna and at least one directional antenna. When the intelligent terminal wants to send a packet to another intelligent terminal, the intelligent terminal first obtains a destination MAC address of the to-be-sent packet; then determines, based on a known mapping relationship between a MAC address and a wireless antenna, a target wireless antenna corresponding to the destination MAC address; and then sends the to-be-sent packet by using the target wireless antenna, where the known mapping relationship between the MAC address and the wireless antenna is configured based on an orientation relationship between the intelligent terminal and different neighboring devices, the different neighboring devices include other intelligent terminals and/or a management device, the management device is configured to store data collected by each intelligent terminal, and the target wireless antenna is one of the at least one directional antenna.

A packet receiving solution provided in the embodiments of this application is applied to an intelligent terminal having a wireless communication function, where the intelligent terminal is provided with a plurality of wireless antennas including an omnidirectional antenna and at least one directional antenna. When the intelligent terminal needs to receive a packet sent by another intelligent terminal, the intelligent terminal first obtains a MAC address of the packet sender; then determines, based on a known mapping relationship between a MAC address and a wireless antenna in the intelligent terminal, a target wireless antenna corresponding to the MAC address of the packet sender; and then receives, by using the target wireless antenna, the packet sent by the packet sender, where the known mapping relationship between the MAC address and the wireless antenna is configured based on an orientation relationship between the intelligent terminal and different neighboring devices, the different neighboring devices include other intelligent terminals and/or a management device, the management device is configured to store data collected by each intelligent terminal, and the target wireless antenna is one of the plurality of wireless antennas.

Based on the solutions provided in the embodiments of this application, different devices around the intelligent terminal are identified by their MAC addresses, and a mapping relationship is established between the MAC addresses and wireless antennas. When the intelligent terminal sends a packet, the intelligent terminal can use, based on a known mapping relationship between a MAC address and a wireless antenna, a directional antenna matching a destination MAC address to send the to-be-sent packet to a device corresponding to the destination MAC address. When the intelligent terminal receives a packet, the intelligent terminal can use, based on a known mapping relationship between a MAC address and a wireless antenna, a wireless antenna matching a MAC address of a sender to receive the packet sent by a device corresponding to the MAC address. Therefore, signal quality in wireless transmission is improved, and stability of wireless transmission is improved.

Other features and advantages of this application will be set forth later in the specification, and in part will be readily apparent from the specification, or may be understood by implementing this application. Objectives and other advantages of this application may be achieved and obtained by using a structure particularly stated in the written specification, claims, and accompanying drawings.

BRIEF DESCRIPTION OF DRAWINGS

The accompanying drawings described herein are intended for better understanding of this application, and constitute a part of this application. Exemplary embodiments and descriptions thereof in this application are intended to interpret this application and do not constitute any improper limitation on this application.

FIG. 3 is a mapping relationship table between MAC addresses and wireless antennas in P1 according to an embodiment of this application.

FIG. 4 is another mapping relationship table between MAC addresses and wireless antennas in P1 according to an embodiment of this application.

FIG. 5 is a packet queue scheduling time sequence table in a period according to an embodiment of this application.

FIG. 6 is correspondences between queue identifiers and time slice index values according to an embodiment of this application.

DESCRIPTION OF EMBODIMENTS

To make the objectives, technical solutions, and advantages of the embodiments of this application clearer, the following clearly and thoroughly describes the technical solutions of this application with reference to the accompanying drawings in the embodiments of this application. Apparently, the described embodiments are some but not all of the embodiments of this application. All other embodiments obtained by a person of ordinary skill in the art based on the embodiments described in this application document without creative efforts shall fall within the protection scope of the technical solutions of this application.

In the specification, claims, and accompanying drawings of this application, the terms "first" and "second" are used to distinguish between different objects, and not intended to describe a specific order. In addition, the terms "include" and any other variant thereof are intended to cover nonexclusive protection. For example, a process, method, system, product, or device that includes a list of steps or units is not limited to the listed steps or units, but optionally includes steps or units not listed, or optionally includes other steps or units inherent to the process, method, product, or device. The term "a plurality of" in this application may mean at least two, for example, two, three, or more. However, the embodiments of this application are not limited thereto.

In addition, the term "and/or" in this specification describes only an association relationship for describing associated objects and represents that three relationships may exist. For example, A and/or B may represent the following three cases: Only A exists, both A and B exist, and only B exists. In addition, unless otherwise specified, the character "/" in this specification usually indicates an "or" relationship between associated objects. A time sequence of steps in each of the following method embodiments is merely an example but is not strictly limited.

Figure 1:
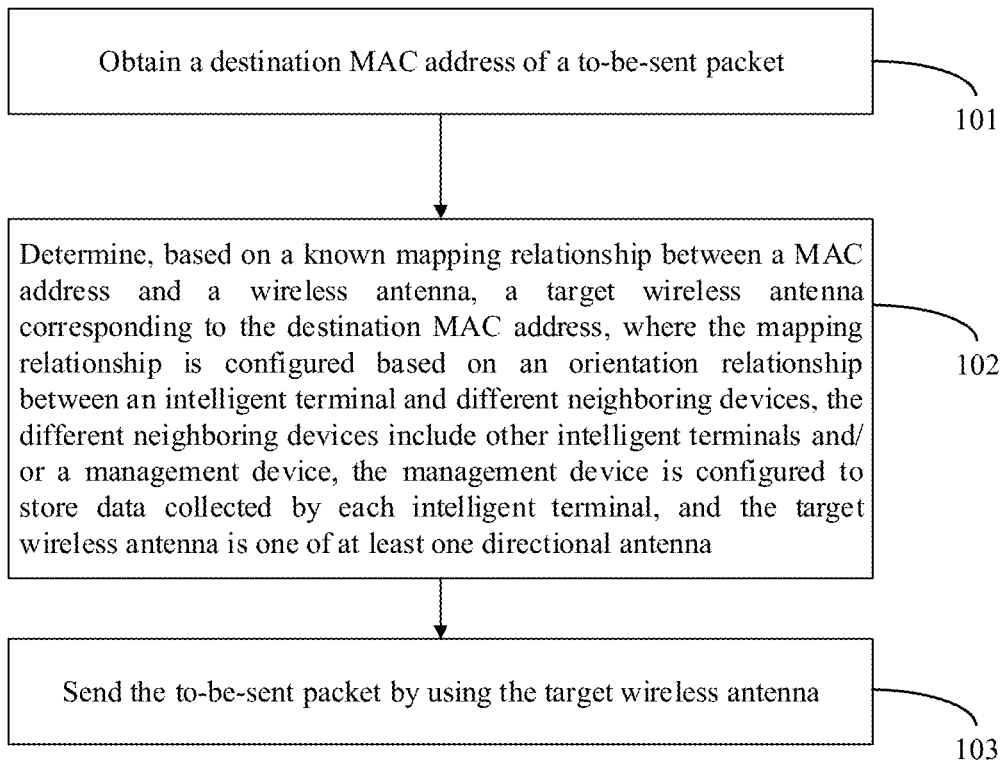
FIG. 1 is a flowchart of a packet sending method according to an embodiment of this application.

FIG. 1 is a flowchart of a packet sending method according to an embodiment of this application. The packet sending method is performed by an intelligent terminal having a wireless communication function, where the intelligent terminal is provided with a plurality of wireless antennas including an omnidirectional antenna and at least one directional antenna. As shown in FIG. 1, the method includes the following steps:

101. Obtain a destination MAC address of a to-be-sent packet.

102. Determine, based on a known mapping relationship between a MAC address and a wireless antenna, a target wireless antenna corresponding to the destination MAC address, where the mapping relationship is configured based on an orientation relationship between the intelligent terminal and different neighboring devices, the different neighboring devices include other intelligent terminals and/or a management device, the management device is configured to store data collected by each intelligent terminal, and the target wireless antenna is one of the plurality of wireless antennas.

103. Send the to-be-sent packet by using the target wireless antenna.

One spirit of the packet sending method provided in this embodiment of this application is to establish the mapping relationship between the MAC address and the wireless antenna, and when sending the packet, choose the matched directional antenna to send the to-be-sent packet to a device corresponding to the destination MAC address, thereby improving signal quality in wireless transmission and improving stability of wireless transmission.

Generally, if it is inconvenient to deploy wired devices for wired communication in an actual scenario, a usual choice is to deploy intelligent terminals having wireless communication functions for wireless communication. The intelligent terminals include but are not limited to intelligent terminals such as wireless bridges and IPC devices.

Taking IPC devices as an example, during deployment of a video surveillance network, if it is inconvenient to deploy wired links, a plurality of IPC devices may be installed in different areas of a same floor to monitor the floor. The IPC devices have photographing functions and are capable of collecting video data in different areas in real time. In addition, because the IPC devices are provided with Wi-Fi modules, the IPC devices may further establish communication connections with other IPC devices or the management device (for example, a storage device or a video-on-demand device). It should be noted that all the IPC devices mentioned in this embodiment of this application are wireless IPC devices.

As a surveillance device, an IPC device often needs to transmit video data to the storage device after collecting the video data. However, in an actual application scenario, the IPC device collecting the video data is usually at a distance from the storage device and cannot directly transmit the collected video data to the storage device. In consideration of this case, when a user deploys IPC devices in an area, the user usually deploys some IPC devices used as relay nodes. These IPC devices are capable of not only collecting video data in the area and transmitting the video data to the storage device, but also receiving video data transmitted by other nearby IPC devices and forwarding the received video data to the storage device.

It may be understood that, in a scenario, a plurality of storage devices in different positions may require each IPC device to transmit collected video data. When an IPC device that acts as a relay node forwards received video data or transmits video data collected by itself to storage devices in different positions, it is also possible that the video data can be sent to the storage devices by using other IPC devices that act as relay nodes, as shown in FIG. 2.

Figure 2:
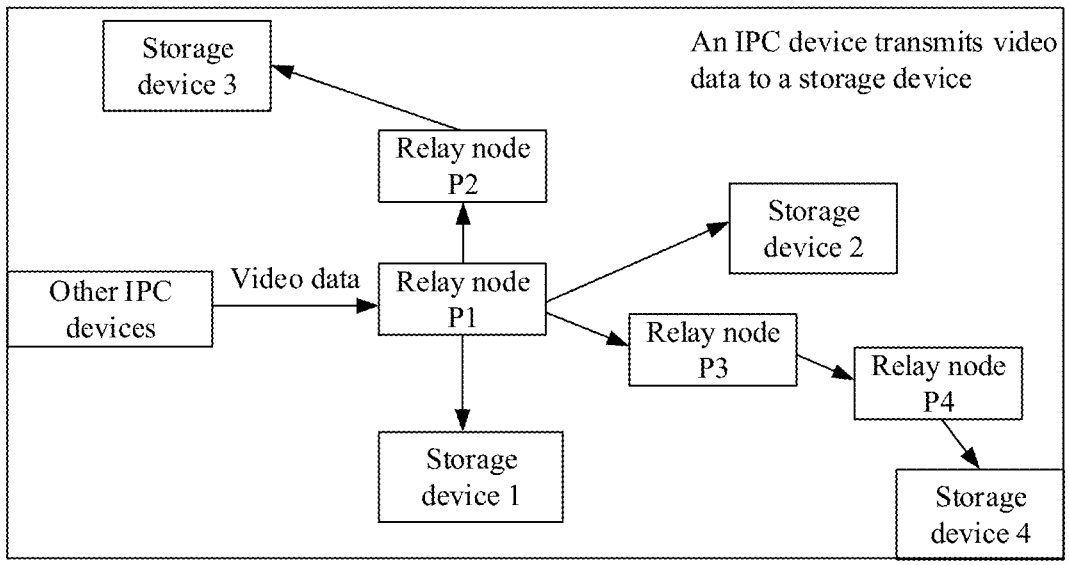
FIG. 2 is a schematic diagram of a scenario in which an IPC device transmits video data to a storage device according to an embodiment of this application.

FIG. 2 is a schematic diagram of a scenario in which an IPC device transmits video data to a storage device according to an embodiment of this application. In the scenario shown in FIGS. 2, P1 to P4 represent IPC devices located in different positions. For received video data transmitted by other IPC devices or video data collected by itself, the relay node P1 may directly transmit the video data to a storage device 1 or a storage device 2 in a form of a packet, or transmit the video data to a storage device 3 through the relay node P2, or transmit the video data to a storage device 4 through more relay nodes (P3 and P4). In a specific implementation process, the video data may be transmitted to corresponding storage devices according to control instructions issued by different storage devices.

In a video transmission process, if there are factors such as obstructions that influence signal strength between the relay node P1 and P2, P3, the storage device 1, or the storage device 2, strength of signals transmitted during transmission of the video data may be low, and P2, P3, the storage device 1, or the storage device 2 cannot receive the video data sent by P1, finally resulting in video data transmission failure.

In a conventional method, signal strength in wireless data transmission may be enhanced by increasing a quantity of relay nodes within a range, so that data transmission is more stable. However, this method may undoubtedly increase costs.

Therefore, an embodiment of this application provides a packet sending method, applied to an intelligent terminal. When sending a packet, the intelligent terminal may schedule a directional antenna that matches a destination MAC address of the packet to send the to-be-sent packet, thereby improving signal strength in wireless transmission, improving signal quality in wireless transmission, and improving stability of wireless transmission. If the packet sending method provided in this embodiment of this application is applied to P1 in the scenario shown in FIG. 2 in which an IPC device is used to transmit video data, when P1 transmits the video data to P2, P3, the storage device 1, or the storage device 2, wireless transmission thereof may be more stable, and a success rate of video data transmission may be higher.

The packet sending method provided in this embodiment of this application is applied to an intelligent terminal having a wireless communication function, where the intelligent terminal is provided with a plurality of wireless antennas including an omnidirectional antenna and at least one directional antenna, and these wireless antennas may be configured to receive or send packets.

For ease of understanding, in this embodiment of this application, it is assumed that the intelligent terminal is an IPC device. The packet sending method shown in FIG. 1 is exemplarily described by using the IPC device as an example and referring to the scenario of video data transmission shown in FIG. 2.

In an embodiment of this application, when the IPC device P1 as a relay node wants to send a packet including video data, first, P1 obtains a destination MAC address of the to-be-sent packet; then P1 determines, based on a known mapping relationship between a MAC address and a wireless antenna that is preconfigured in the device, a directional antenna corresponding to the destination MAC address of the to-be-sent packet; and finally, by using the directional antenna, P1 sends the to-be-sent packet to a device corresponding to the destination MAC address.

It should be noted that the mapping relationship between the MAC address and the wireless antenna that is configured in P1 is configured, when the user deploys the video surveillance network, based on working ranges of different directional antennas in P1 and an orientation relationship of the directional antenna to the neighboring IPC devices (P2 and P3) and the management device (storage device 1 or storage device 2). A working range of a directional antenna may be understood as a range within which signal strength of radio signals sent by the directional antenna and received by other devices may be greater than a threshold. In this case, signal quality in wireless transmission is high, stability of wireless transmission is high, and this range is the working range of the directional antenna.

When the mapping relationship between the MAC address and the wireless antenna is configured for P1, different devices around P1 may be identified by their MAC addresses. For a device located within a working range of a directional antenna of P1 with an angle, it is determined that a mapping relationship between a MAC address of the device and the directional antenna with the angle exists. In a specific implementation process, angles of directional antennas in P1 may be set first, and then other devices may be installed within corresponding working ranges of directional antennas with different angles, so that a mapping relationship between MAC addresses of different neighboring devices and the directional antennas with different angles is determined; or P1 and different devices around P1 may be installed in a specified area first, and then a mapping relationship between MAC addresses of different neighboring devices and the directional antennas with different angles may be determined by adjusting the angles of the directional antennas in P1.

In this embodiment of this application, a reason why a directional antenna is chosen to send packets is that when sending signals, the directional antenna may concentrate all energy in a specific direction. In comparison with the omnidirectional antenna, this transmission characteristic may cause strength and quality of the signals sent by the directional antenna to be both higher than those of the omnidirectional antenna within a same distance.

Optionally, to enable the IPC device to have high wireless communication quality in a plurality of directions, a plurality of directional antennas with different angles may be deployed in the IPC device, thereby increasing a reliable communication range of the IPC device.

If the devices configured around P1 are changed, for example, if a new device is added, because the known mapping relationship between the MAC address and the wireless antenna does not include a mapping relationship between a MAC address of the new device and a directional antenna, when the destination MAC address in the packet to be sent by P1 is the MAC address corresponding to the new device, P1 does not know which directional antenna with which angle is the target wireless antenna corresponding to the new device, and therefore cannot send the packet to the new device by using the corresponding directional antenna.

In a case that no mapping relationship corresponding to the destination MAC address exists, it may be determined that the target wireless antenna corresponding to the destination MAC address is the omnidirectional antenna, so that the to-be-sent packet is broadcast by using the omnidirectional antenna; then a broadcast response packet fed back by a target device is received by using a target directional antenna, where the target device is one of the different neighboring devices, the destination MAC address is a MAC address of the target device, and the target directional antenna is one of the at least one directional antenna; and finally, a correspondence between the destination MAC address and the target directional antenna is updated into the mapping relationship.

For ease of understanding, for example, in a case that P1 sends the packet to the new device, if P1 cannot find a directional antenna corresponding to the MAC address of the new device in the known mapping relationship between the MAC address and the wireless antenna, P1 broadcasts then, by using the omnidirectional antenna, the packet to be sent to the new device. After receiving the broadcast packet, the new device may feed back a broadcast response packet to P1. In a specific implementation process, a plurality of directional antennas with different angles in P1 may receive the broadcast response packet. P1 may determine, based on signal strength of the broadcast response packet received by the directional antennas with different angles, that a directional antenna with highest received signal strength is the target directional antenna, and update the correspondence between the MAC address of the new device and the target directional antenna into the mapping relationship between the MAC address and the wireless antenna. When P1 needs to send a packet to the new device again, P1 may send the packet to the new device by using the target directional antenna based on the correspondence between the MAC address of the new device and the directional antenna in the updated mapping relationship between the MAC address and the wireless antenna.

In a specific implementation process, the mapping relationship between the MAC address and the wireless antenna may be implemented as a mapping relationship table between the MAC address and the wireless antenna, or may be in other forms. This is not limited. FIG. 3 is a mapping relationship table between a MAC address and a wireless antenna in P1 according to an embodiment of this application. It can be seen from the mapping relationship table shown in FIG. 3 that packets with different destination MAC addresses may be sent by using directional antennas with a same angle. For example, packets whose destination MAC addresses are MAC 1 and MAC 3 may be both sent by using a directional antenna with an angle of 90 degrees. This indicates that P3 and the storage device 2 are both within a working range of the directional antenna with the angle of 90 degrees. However, for a same MAC address, only one directional antenna with an angle in the mapping relationship has a mapping relationship with the MAC address. It should be noted that angles of directional antennas shown in FIG. 3 are determined by using a same reference direction for reference and based on a position relationship between a signal transmission direction of each directional antenna and the reference direction.

Referring to the mapping relationship table shown in FIG. 3 and assuming that the destination MAC address of the packet to be sent by the relay node P1 is MAC 2, P1 may know, by querying the mapping relationship table between the MAC address and the wireless antenna, that the target wireless antenna corresponding to MAC 2 is a directional antenna with an angle of 180 degrees. Then P1 sends the to-be-sent packet to the storage device 1 by using the directional antenna with the angle of 180 degrees.

Assuming that no mapping relationship between MAC 2 and the directional antenna exists in the mapping relationship table shown in FIG. 3, but the storage device 1 is practically within a working range of the directional antenna with the angle of 180 degrees. Under this assumption, if the destination MAC address of the packet to be sent by the relay node P1 is MAC 2, P1 cannot find, by querying the mapping relationship table between the MAC address and the wireless antenna, the directional antenna corresponding to MAC 2, P1 needs to broadcast the to-be-sent packet by using the omnidirectional antenna. After receiving the broadcast packet, the storage device 1 may feed back a broadcast response packet to P1. Based on an assumption that the storage device 1 is within the working range of the directional antenna with the angle of 180 degrees, the signal strength received by the directional antenna with the angle of 180 degrees is the highest among the directional antennas in P1 that receive the broadcast response packet. Therefore, it can be determined that the directional antenna with the angle of 180 degrees is the target directional antenna. A mapping relationship between MAC 2 and the directional antenna with the angle of 180 degrees exists. P1 updates the mapping relationship into the mapping relationship table between the MAC address and the wireless antenna shown in FIG. 3. When P1 needs to send a packet to the storage device 1 again, P1 may send the packet to the storage device 1 by using the directional antenna with the angle of 180 degrees based on the correspondence between MAC 2 and the directional antenna with the angle of 180 degrees in the updated mapping relationship between the MAC address and the wireless antenna.

According to the foregoing packet sending method, when sending a packet, the IPC device P1 as a relay node can send, based on a destination MAC address of the packet and a preset mapping relationship between a MAC address and a wireless antenna in P1, the packet to a device corresponding to the destination MAC address by using a directional antenna matching the destination MAC address, thereby enhancing signal strength in wireless transmission, improving signal quality in wireless transmission, and improving stability of wireless transmission.

It may be understood that, as a relay node, in the scenario of video transmission, P1 not only needs to transmit video data of each IPC device to each storage device in a form of a packet, but also needs to send a video data transmission control instruction issued by each storage device to other IPC devices, where the control instruction is usually sent in a form of a broadcast packet.

For the foregoing case, in another embodiment of this application, the mapping relationship between the MAC address and the wireless antenna that is configured in P1 may further include a packet type, where the packet type includes a broadcast packet and/or a unicast packet. After obtaining the destination MAC address of the to-be-sent packet, P1 first determines the type of the packet and determines, based on the type of the packet, an appropriate target wireless antenna to send the packet. It should be understood that the packet type may further include a multicast packet. In this embodiment of this application, the broadcast packet and the unicast packet are mainly described in detail by using examples. Processing of the multicast packet is similar to that of the broadcast packet and therefore is not described in detail.

Specifically, if the to-be-sent packet is a broadcast packet, it is determined that the target wireless antenna is the omnidirectional antenna, and the to-be-sent packet is broadcast by using the omnidirectional antenna. If the to-be-sent packet is a unicast packet, P1 determines, from the mapping relationship between the MAC address and the wireless antenna based on the destination MAC address, the directional antenna corresponding to the destination MAC address as the target wireless antenna, and sends the to-be-sent packet by using the directional antenna. If the mapping relationship between the destination MAC address and the directional antenna does not exist in the preset mapping relationship between the MAC address and the wireless antenna in P1, the to-be-sent packet is broadcast in the manner described in the previous embodiment, the target directional antenna is determined based on the broadcast response packet, and the learned mapping relationship between the destination MAC address and the target directional antenna is updated into the mapping relationship table between the MAC address and the wireless antenna in P1. For a specific implementation process, refer to the previous embodiment. Details are not described herein again.

Further, to improve stability of packet sending by P1, a quantity of packet queues (hereinafter referred to as queues) may be constructed in P1, and to-be-sent packets may be sent stably and orderly by orderly scheduling the queues. In construction of a queue, the queue has a mapping relationship with a MAC address, a packet type, and a wireless antenna, specifically as shown in FIG. 4. FIG. 4 is another mapping relationship table between a MAC address and a wireless antenna in P1 according to an embodiment of this application. The mapping relationship in the table includes a first mapping relationship and a second mapping relationship, where the first mapping relationship is a mapping relationship between a MAC address, a packet type, and a queue, and the second mapping relationship is a mapping relationship between a queue and a wireless antenna.

An idea for configuring the mapping relationship table shown in FIG. 4 is as follows: First, the mapping relationship between the MAC address, the packet type, and the wireless antenna is configured, where the packet type includes a broadcast packet and/or a unicast packet. For the broadcast packet, the broadcast packet needs to be broadcast to all the neighboring devices. Therefore, the omnidirectional antenna is more suitable for sending the broadcast packet, and a mapping relationship can be established between the broadcast packet and the omnidirectional antenna. It should be understood that the packet type may further include a multicast packet. In this embodiment of this application, the broadcast packet and the unicast packet are mainly described in detail by using examples. Processing of the multicast packet is similar to that of the broadcast packet and therefore is not described in detail. For the unicast packet, the packet needs to be sent to the device corresponding to the destination MAC address. As can be learned according to the foregoing content, when sending a packet to a device, choosing an appropriate directional antenna is more conducive to radio signal transmission. Therefore, a mapping relationship can be established between the unicast packet and the MAC address and the directional antenna, where the mapping relationship between the MAC address and the directional antenna is configured based on a working range of the directional antenna and an orientation relationship between the device corresponding to the MAC address and P1. For specific content, refer to the foregoing related content. Details are not described herein again. Then the second mapping relationship between the queue and the wireless antenna is configured. When the second mapping relationship is configured, a one-to-one correspondence between the queue and the wireless antenna exists. For a queue, a to-be-sent packet buffered in the queue can be sent only by a wireless antenna corresponding to the queue. An implementation is to establish a mapping relationship between the queue and a control parameter of the wireless antenna corresponding to the queue. Specifically, when P1 schedules the queue, based on the control parameter of the wireless antenna corresponding to the queue, an antenna for sending the packet may be switched to the wireless antenna corresponding to the queue, and the to-be-sent packets buffered in the queue is sent by using the wireless antenna. The first mapping relationship may be determined based on the configured mapping relationship between the MAC address, the packet type, and the wireless antenna, and the second mapping relationship.

It can be learned from the foregoing process of configuring the mapping relationship table that packets with different destination MAC addresses may be delivered to a same queue. For example, in FIG. 4, unicast packets with destination MAC addresses MAC 1 and MAC 3 may be both delivered to a queue Q1 because wireless antennas corresponding to the unicast packets are both the directional antenna with the angle of 90 degrees. However, packets with a same destination MAC address cannot be delivered to different queues, that is, the packets with the destination MAC address can be delivered to only one queue.

After the mapping relationship table shown in FIG. 4 is configured, when P1 wants to send the packet, first, P1 obtains the destination MAC address and the packet type of the to-be-sent packet; then determines, based on the preset first mapping relationship between the MAC address, the packet type, and the queue in the mapping relationship table shown in FIG. 4, a target queue corresponding to the destination MAC address; then stores the to-be-sent packet in the target queue; when the target queue meets a scheduling condition, determines, based on the preset second mapping relationship between the queue and the wireless antenna, the target wireless antenna corresponding to the target queue; and finally sends the to-be-sent packet by using the target wireless antenna.

For ease of understanding, an example is used with reference to FIG. 4. Assuming that the destination MAC address of the packet to be sent by the relay node P1 is MAC 2 and that the packet type of the to-be-sent packet is a unicast packet, P1 may learn, by querying the mapping relationship table between the MAC address and the wireless antenna shown in FIG. 4, that the queue corresponding to MAC 2 is Q2; after delivering the to-be-sent packet to the corresponding queue Q2, wait for scheduling of the queue Q2; and when the queue Q2 meets the scheduling condition, send the to-be-sent packet to the storage device 1 by using the directional antenna with the angle of 180 degrees based on the second mapping relationship between the queue Q2 and the directional antenna with the angle of 180 degrees.

It may be understood that more than one queue may be constructed in the relay node P1. In a specific implementation process, to ensure stable and orderly transmission of packets, these queues are scheduled periodically based on a preset scheduling sequence and scheduling time. FIG. 5 is a packet queue scheduling time sequence table in a period according to an embodiment of this application. The scheduling sequence and scheduling time of each queue are set based on an actual service requirement of the user. In a period, a same queue may be scheduled for a plurality of times, and the time of each scheduling may be different. For example, when P1 is working, a quantity of packets that need to be sent to a device is usually greater than a quantity of packets to be sent to other devices. In this case, in the setting of a scheduling sequence and scheduling time of a plurality of queues constructed by P1, a longer scheduling time may be allocated to a queue corresponding to a MAC address of the device. Specifically, the queue corresponding to the MAC address of the device may be scheduled for a plurality of times in a scheduling period, or a longer scheduling time may be allocated to the queue during scheduling of the queue.

As shown in FIG. 5, a specific case of queue scheduling in a period is: first scheduling a queue Q0 for one time slice, then scheduling the queue Q2 for one time slice, then scheduling the queue Q1 for three time slices, then scheduling the queue Q0 for two time slices, and finally scheduling a queue Q3 for one time slice. The time slice may be understood as a unit time length preset by the user based on an actual requirement. For example, a length of a time slice may be 1 millisecond. For the scheduling time sequence table shown in FIG. 5, one scheduling period is eight time slices, and duration of the corresponding scheduling period is 8 milliseconds. The scheduling period is an integer multiple of the preset time slice length, and a quantity of scheduled queues in a scheduling period is less than or equal to a quantity of time slices included in the scheduling period.

To facilitate determining of whether a queue meets the scheduling condition and sending of a packet buffered in the queue that meets the scheduling condition, in an embodiment of this application, a time slice index is established for a scheduled queue corresponding to each time slice in a period, as shown in FIG. 6. FIG. 6 is a correspondence between a queue identifier and a time slice index value according to an embodiment of this application. In the correspondence shown in FIG. 6, a scheduling time sequence of queues matches that in FIG. 5, the scheduling period is eight time slices, and there is a time slice index value for the scheduled queue corresponding to each time slice. Specifically, in a period, a queue scheduled in a first time slice is Q0, and a time slice index value corresponding to this queue is 0; a queue scheduled in a second time slice is Q2, and a time slice index value corresponding to this queue is 1; a queue scheduled in a third time slice is Q1, and a time slice index value corresponding to this queue is 2; a queue scheduled in a fourth time slice is Q1, and a time slice index value corresponding to this queue is 3; a queue scheduled in a fifth time slice is Q1, and a time slice index value corresponding to this queue is 4; a queue scheduled in a sixth time slice is Q0, and a time slice index value corresponding to this queue is 5; a queue scheduled in a seventh time slice is Q0, and a time slice index value corresponding to this queue is 6; and a queue scheduled in an eighth time slice is Q3, and a time slice index value corresponding to this queue is 7.

Figure 7:
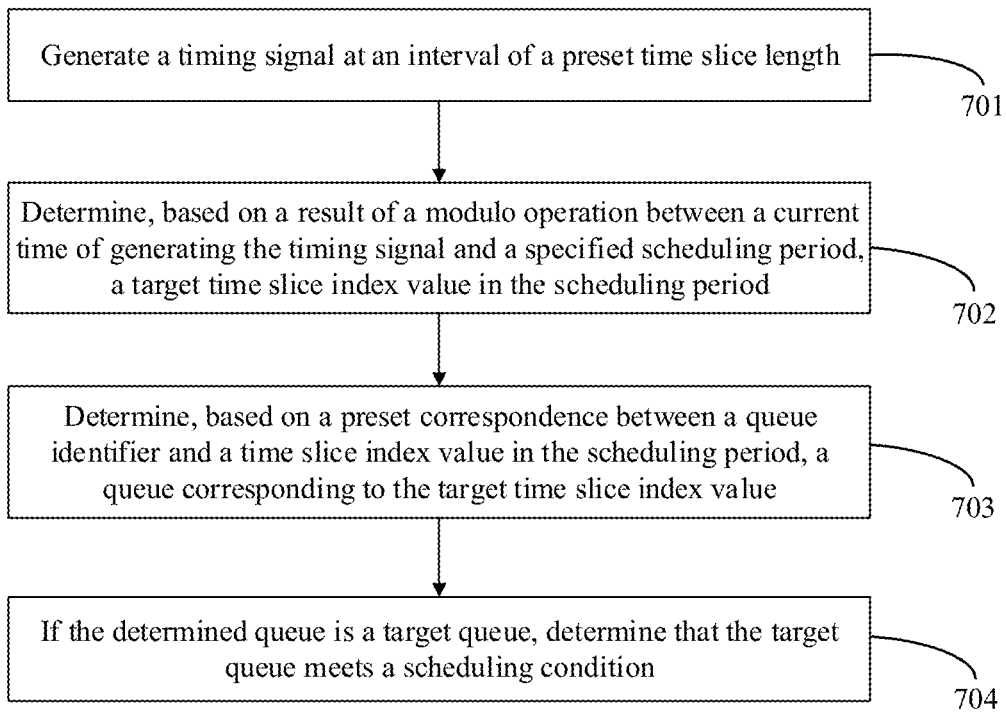
FIG. 7 is a flowchart of a method for determining that a target queue meets a scheduling condition according to an embodiment of this application.

A specific process of determining whether the target queue meets the scheduling condition after the correspondence between the queue identifier and the time slice index value is determined is shown in FIG. 7. FIG. 7 is a flowchart of a method for determining whether the target queue meets the scheduling condition according to an embodiment of this application. The method may include the following steps:

701. Generate a timing signal at an interval of a preset time slice length.

702. Determine, based on a result of a modulo operation between a current time of generating the timing signal and a specified scheduling period, a target time slice index value in the scheduling period.

703. Determine, based on a preset correspondence between a queue identifier and a time slice index value in the scheduling period, a queue corresponding to the target time slice index value.

704. If the determined queue is the target queue, determine that the target queue meets the scheduling condition.

In an implementation, a timer whose period is a preset time slice length (for example, 1 millisecond) is established in P1, so that a timing signal can be generated at an interval of the preset time slice length; and after P1 receives the timing signal, P1 calculates a time difference between the current time of generating the timing signal and a reference time preset in the system, calculates a quantity of time slices of the preset time slice length that are included in the time difference, and performs a modulo operation between the calculated quantity of time slices and a quantity of time slices in the specified scheduling period, where a result of the modulo operation is the target time slice index value in the scheduling period.

The foregoing hypothetical case is still used as an example. Assuming that the destination MAC address of the packet to be sent by the relay node P1 is MAC 2 and that the packet type of the to-be-sent packet is a unicast packet, after the to-be-sent packet is delivered to the corresponding queue Q2, a modulo operation is performed by using the method shown in FIG. 7. If an operation result determines that the target time slice index value is 1, it can be learned according to FIG. 6 that an identifier of a scheduled queue corresponding to the time slice index value 1 is Q2. This indicates that the currently scheduled queue is Q2. Because Q2 is the target queue, the target queue Q2 meets the scheduling condition. Based on the second mapping relationship between the queue Q2 and the directional antenna with the angle of 180 degrees shown in FIG. 4, the to-be-sent packet may be sent to the storage device 1 by using the directional antenna with the angle of 180 degrees.

After the modulo operation, if it is determined that the target time slice index value is not 1, for example, is 6, it can be learned according to FIG. 6 that an identifier of a scheduled queue corresponding to the time slice index value 6 is Q0. This indicates that the currently scheduled queue is Q0 instead of Q2. In this case, Q2 does not meet the scheduling condition and needs to continue to wait for being scheduled. Referring to FIG. 6, it can be learned that scheduling of queues is performed periodically. Therefore, if the currently calculated time slice index value is 6 and the scheduled queue is Q0, it is necessary to wait for two preset time slices to schedule Q3 and Q0 separately before Q2 can meet the scheduling condition and the to-be-sent packet can be sent to the storage device 1 by using the directional antenna with the angle of 180 degrees based on the second mapping relationship shown in FIG. 4.

To facilitate determining of whether a queue meets the scheduling condition and sending of a packet buffered in the queue that meets the scheduling condition, an embodiment of this application further provides a method for determining whether the target queue meets the scheduling condition. The method specifically includes the following steps:

Step 1: Obtain arrangement information of the intelligent terminal and the different neighboring devices, where the arrangement information is used to identify a packet sender and a packet receiver corresponding to each slot, and the packet sender and the packet receiver are respectively one of the intelligent terminal and the different neighboring devices.

Step 2: When a device corresponding to the destination MAC address is the packet receiver and the intelligent terminal is the packet sender, determine, based on the arrangement information, that the target queue meets the scheduling condition.

Specifically, in a network formed by the intelligent terminal and the different neighboring devices, a central node device (such as a root node) or the management device may be used to determine the arrangement information based on an association relationship or a network topology of the devices in the network, a packet sending priority of each device, traffic of each device, and the like. A device sending a packet and a device receiving the packet in a slot may be determined based on the arrangement information. Specifically, based on slot allocation information for each device to use wireless resources in at least one time window, arrangement information corresponding to each slot is determined. The arrangement information includes a packet sender and a packet receiver corresponding to the corresponding slot. A plurality of pieces of obtained arrangement information are sorted based on the slots in the slot allocation information, and total arrangement information is obtained.

For example, the total arrangement information may be shown in the following table, and specifically means that in slot 1, a device 1 sends a packet to a device 2, and so on.

| Slot | Slot 1 | Slot 2 | Slot 3 | Slot 4 | ... |
| --- | --- | --- | --- | --- | --- |
| Packet sender | Device 1 | Device 3 | Device 2 | Device 2 | ... |
| Packet receiver | Device 2 | Device 2 | Management device | Device 1 | ... |

Based on the arrangement information, whether a packet sender in a current slot is an intelligent terminal is determined. If so, it is the turn of the intelligent terminal to send a packet in the current slot. Because the intelligent terminal may have a plurality of sending queues, it is further necessary to determine which sending queue has a packet to be sent in this slot. Therefore, whether a packet receiver in the current slot is the device corresponding to the MAC address in the target queue may be determined. If yes, the packet in the target queue needs to be sent in this slot, that is, it is determined that the target queue meets the scheduling condition. In other words, when the device corresponding to the destination MAC address is the packet receiver and the intelligent terminal is the packet sender, it is determined, based on arrangement information of the current slot, that the target queue meets the scheduling condition.

During scheduling of queues, each queue has its corresponding scheduling time, and a quantity of packets that are buffered in the queue and that can be sent within the preset scheduling time is limited. Therefore, if all the buffered packets in the target queue are not sent in a scheduling period, the buffered packets may continue to be sent by using the corresponding wireless antenna when the target queue meets the scheduling condition again in a next scheduling period, and so on, until all the buffered packets are sent after a plurality of periods of sending.

In a solution provided in this embodiment of this application, a plurality of omnidirectional antennas and at least one directional antenna are configured in an IPC device. When P1 as a relay node needs to send a packet, first, P1 obtains a destination MAC address of the to-be-sent packet and a packet type of the to-be-sent packet; then determines, based on a preconfigured first mapping relationship between a packet type, a MAC address, and a queue, a target queue for buffering the to-be-sent packet, and stores the to-be-sent packet in the target queue; then waits for scheduling of the target queue, and when determining, based on a calculated time slice index value or arrangement information, that the target queue is scheduled, determines, based on a second mapping relationship between a queue and a wireless antenna, a target wireless antenna corresponding to the queue; and finally, uses the target wireless antenna to send the to-be-sent packet buffered in the queue.

In the foregoing solution, a mapping relationship is established between a MAC address, a packet type, a queue, and a wireless antenna. When a to-be-sent packet needs to be sent, the packet is sent by scheduling a queue and using a wireless antenna matching the queue. This is conducive to stable and orderly sending of the packet. In particular, for a unicast packet, after the unicast packet is buffered in a corresponding queue based on a destination MAC address, when the queue is scheduled, a directional antenna matching the queue may be used to send the buffered packet in the queue. This can enhance signal strength of the packet sent in wireless transmission, improve signal quality in wireless transmission, and improve stability of wireless transmission.

In this embodiment of this application, the packet sending method shown in FIG. 1 is described by using the relay node P1 as an example. Practically, it may be understood that any IPC device has the need to send a packet, and there may be more than one destination MAC address of a packet to be sent by the IPC device. In addition, during construction of a multi-level cascade network topology, an IPC device originally used only to collect video data may also become a relay node and needs to send packets to a plurality of neighboring devices. Therefore, to facilitate application in a multi-level cascade scenario, any IPC device may use the packet sending method in the foregoing embodiment to send a packet, and is not limited to acting as a relay node.

The following describes in detail a packet sending apparatus according to one or more embodiments of this application. A person skilled in the art may understand that all such apparatuses may be constructed by using commercially available hardware components and configured according to the steps imparted in this solution.

Figure 8:
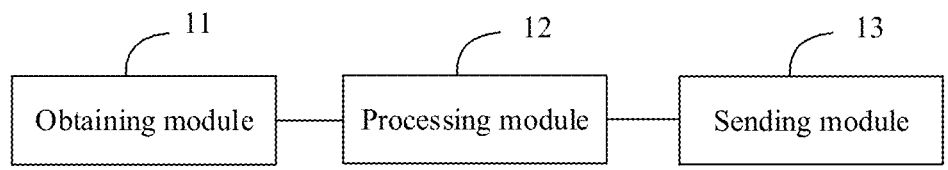
FIG. 8 is a schematic diagram of a structure of a packet sending apparatus according to an embodiment of this application.

FIG. 8 is a schematic diagram of a structure of a packet sending apparatus according to an embodiment of this application. The apparatus is located in an intelligent terminal having a wireless communication function. The intelligent terminal is provided with a plurality of wireless antennas, and the plurality of wireless antennas include an omnidirectional antenna and at least one directional antenna. As shown in FIG. 8, the apparatus includes an obtaining module 11, a processing module 12, and a sending module 13.

The obtaining module 11 is configured to obtain a destination MAC address of a to-be-sent packet.

The processing module 12 is configured to determine, based on a known mapping relationship between a MAC address and a wireless antenna, a target wireless antenna corresponding to the destination MAC address, where the mapping relationship is configured based on an orientation relationship between the intelligent terminal and different neighboring devices, the different neighboring devices include other intelligent terminals and/or a management device, the management device is configured to store data collected by each intelligent terminal, and the target wireless antenna is one of the at least one directional antenna.

The sending module 13 is configured to send the to-be-sent packet by using the target wireless antenna.

Optionally, the processing module 12 is further configured to: when no mapping relationship corresponding to the destination MAC address exists, determine that the target wireless antenna corresponding to the destination MAC address is the omnidirectional antenna, to broadcast the to-be-sent packet by using the omnidirectional antenna; receive, by using a target directional antenna, a broadcast response packet fed back by a target device, where the target device is one of the different neighboring devices, the destination MAC address is a MAC address of the target device, and the target directional antenna is one of the at least one directional antenna; and update a correspondence between the destination MAC address and the target directional antenna into the mapping relationship.

Optionally, the mapping relationship is used to reflect a correspondence between a packet type, a MAC address, and a wireless antenna; and the processing module 12 is further configured to: if the to-be-sent packet is a broadcast packet, determine that the target wireless antenna is the omnidirectional antenna; or if the to-be-sent packet is a unicast packet, determine the target wireless antenna based on the destination MAC address.

Optionally, the processing module 12 is further configured to: determine, based on a preset first mapping relationship between a MAC address, a packet type, and a queue, a target queue corresponding to the destination MAC address; store the to-be-sent packet in the target queue; and if the target queue meets a scheduling condition, determine, based on a preset second mapping relationship between a queue and a wireless antenna, the target wireless antenna corresponding to the target queue, where the mapping relationship includes the first mapping relationship and the second mapping relationship.

Optionally, the processing module 12 is further configured to: generate a timing signal at an interval of a preset time slice length; determine, based on a result of a modulo operation between a current time of generating the timing signal and a specified scheduling period, a target time slice index value in the scheduling period, where duration of the scheduling period is an integer multiple of the preset time slice length, and a quantity of queues is less than or equal to a quantity of time slices included in the scheduling period; determine, based on a preset correspondence between a queue identifier and a time slice index value in the scheduling period, a queue corresponding to the target time slice index value; and if the determined queue is the target queue, determine that the target queue meets the scheduling condition.

Optionally, the processing module 12 is further configured to: obtain arrangement information of the intelligent terminal and the different neighboring devices, where the arrangement information is used to identify a packet sender and a packet receiver corresponding to each slot, and the packet sender and the packet receiver are respectively one of the intelligent terminal and the different neighboring devices; and when a device corresponding to the destination MAC address is the packet receiver and the intelligent terminal is the packet sender, determine, based on the arrangement information, that the target queue meets the scheduling condition.

The apparatus shown in FIG. 8 may perform the steps described in the foregoing embodiment of the packet sending method. For the detailed execution process and technical effect, refer to descriptions in the foregoing embodiment of the packet sending method. Details are not described herein again.

Figure 10:
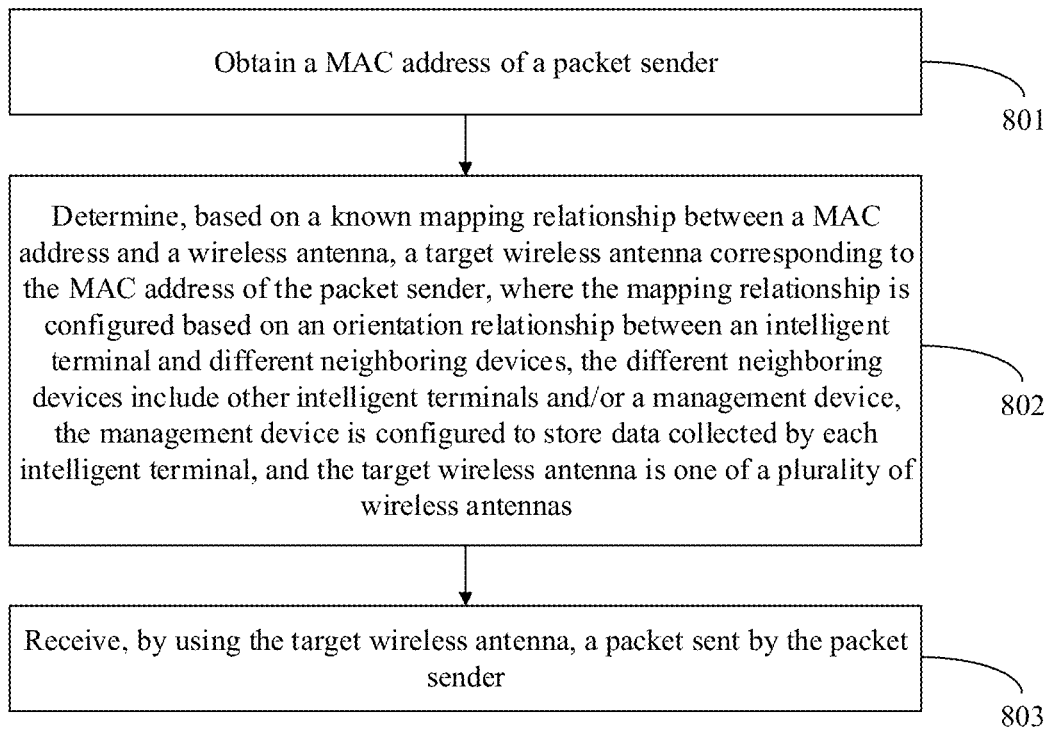
FIG. 10 is a flowchart of a packet receiving method according to an embodiment of this application.

FIG. 10 is a flowchart of a packet receiving method according to an embodiment of this application. The packet receiving method is performed by an intelligent terminal having a wireless communication function. The intelligent terminal is provided with a plurality of wireless antennas including an omnidirectional antenna and at least one directional antenna. As shown in FIG. 10, the method includes the following steps:

801. Obtain a MAC address of a packet sender.

802. Determine, based on a known mapping relationship between a MAC address and a wireless antenna, a target wireless antenna corresponding to the MAC address of the sender, where the mapping relationship is configured based on an orientation relationship between the intelligent terminal and different neighboring devices, the different neighboring devices include other intelligent terminals and/or a management device, the management device is configured to store data collected by each intelligent terminal, and the target wireless antenna is one of the plurality of wireless antennas.

803. Receive, by using the target wireless antenna, a packet sent by the packet sender.

One spirit of the packet receiving method provided in this embodiment of this application is to establish the mapping relationship between the MAC address and the wireless antenna, and when receiving the packet, choose the matched directional antenna to receive the packet sent by a device corresponding to the MAC address of the packet sender, thereby improving signal quality in wireless transmission and improving stability of wireless transmission.

Generally, if it is inconvenient to deploy wired devices for wired communication in an actual scenario, a usual choice is to deploy intelligent terminals having wireless communication functions for wireless communication. The intelligent terminals include but are not limited to intelligent terminals such as wireless bridges and IPC devices. This is similar to the implementation of the foregoing packet sending method.

Optionally, the method further includes:

when no mapping relationship corresponding to the MAC address of the sender exists, determining that the target wireless antenna corresponding to the MAC address of the sender is the omnidirectional antenna, to receive, by using the omnidirectional antenna, the packet sent by the packet sender;

feeding back a response packet to the packet sender by using a target directional antenna, where the packet sender is one of the different neighboring devices, and the target directional antenna is one of the at least one directional antenna; and updating a correspondence between the MAC address and the target directional antenna into the mapping relationship.

It may be understood that determining, based on the known mapping relationship between the MAC address and the wireless antenna, the target wireless antenna corresponding to the MAC address of the sender has a limitation. As shown in FIG. 2, if the devices configured around P1 are changed, for example, if a new device is added, because the known mapping relationship between the MAC address and the wireless antenna does not include a mapping relationship between a MAC address of the new device and a directional antenna, when a source MAC address in the packet to be received by P1 is the MAC address corresponding to the new device, P1 does not know which directional antenna with which angle is the target wireless antenna corresponding to the new device, and therefore cannot use the corresponding directional antenna to receive the packet sent by the new device.

In a case that no mapping relationship corresponding to the MAC address of the packet sender exists, it may be determined that the target wireless antenna corresponding to the MAC address is the omnidirectional antenna, so that the packet sent by the packet sender is received by using the omnidirectional antenna; then a response packet is fed back to the packet sender by using a target directional antenna, where the packet sender is one of the different neighboring devices, and the target directional antenna is one of the at least one directional antenna; and finally, a correspondence between the MAC address of the packet sender and the target directional antenna is updated into the mapping relationship.

Further, to improve a packet receiving effect of P1 to optimal, a quantity of packet receiving queues (hereinafter referred to as receiving queues) may be constructed in P1, and corresponding receiving antennas may be switched based on the receiving queues to achieve an optimal packet transmission effect. During construction of a receiving queue, the receiving queue has a mapping relationship with a MAC address and a wireless antenna. Specifically, the mapping relationship includes a third mapping relationship and a fourth mapping relationship. The third mapping relationship is a mapping relationship between a MAC address and a receiving queue. The fourth mapping relationship is a mapping relationship between a receiving queue and a wireless antenna.

The fourth mapping relationship between the receiving queue and the wireless antenna is configured. When the fourth mapping relationship is configured, a one-to-one correspondence between the receiving queue and the wireless antenna exists. For a receiving queue, a receiving effect is optimal if a packet in the queue is received by a wireless antenna corresponding to the receiving queue. An implementation is to establish a mapping relationship between the receiving queue and a control parameter of the wireless antenna corresponding to the receiving queue. Specifically, when P1 schedules the receiving queue, based on the control parameter of the wireless antenna corresponding to the receiving queue, an antenna for receiving the packet may be switched to the wireless antenna corresponding to the receiving queue, and the packet sent by the packet sender is received by using the wireless antenna. The third mapping relationship may be determined based on the configured mapping relationship between the MAC address and the wireless antenna, and the fourth mapping relationship.

Optionally, the determining, based on the known mapping relationship between the MAC address and the wireless antenna, the target wireless antenna corresponding to the MAC address includes:

determining, based on a preset third mapping relationship between a MAC address and a receiving queue, a target receiving queue corresponding to the MAC address; and if the target receiving queue meets a scheduling condition, determining, based on a preset fourth mapping relationship between a receiving queue and a wireless antenna, the target wireless antenna corresponding to the target receiving queue, where the mapping relationship includes the third mapping relationship and the fourth mapping relationship.

It may be understood that more than one receiving queue may be constructed in the intelligent terminal. In a specific implementation process, to ensure stable and efficient reception of packets, these receiving queues are scheduled periodically based on a preset scheduling sequence and scheduling time.

Therefore, optionally, a specific process of determining whether the target receiving queue meets the scheduling condition is similar to the process of the method for determining whether the target queue meets the scheduling condition shown in FIG. 7. The method may include the following steps:

701. Generate a timing signal at an interval of a preset time slice length.

702. Determine, based on a result of a modulo operation between a current time of generating the timing signal and a specified scheduling period, a target time slice index value in the scheduling period, where duration of the scheduling period is an integer multiple of the preset time slice length, and a quantity of queues is less than or equal to a quantity of time slices included in the scheduling period.

703. Determine, based on a preset correspondence between a queue identifier and a time slice index value in the scheduling period, a queue corresponding to the target time slice index value.

704. If the determined queue is the target queue, determine that the target queue meets the scheduling condition. It should be understood that the target queue herein refers to the target receiving queue determined above. A specific implementation process is similar to the corresponding implementation process of the foregoing packet sending method. Details are not described herein again.

To facilitate determining of whether a queue meets the scheduling condition and sending of a packet buffered in the queue that meets the scheduling condition, an embodiment of this application further provides a method for determining whether the target receiving queue meets the scheduling condition. The method specifically includes the following steps:

Step 1': Obtain arrangement information of the intelligent terminal and the different neighboring devices, where the arrangement information is used to identify a packet sender and a packet receiver corresponding to each slot, and the packet sender and the packet receiver are respectively one of the intelligent terminal and the different neighboring devices.

Step 2': When a device corresponding to the MAC address of the packet sender is the packet sender and the intelligent terminal is the packet receiver in a current slot, determine, based on the arrangement information, that the target receiving queue meets the scheduling condition.

Specifically, in a network formed by the intelligent terminal and the different neighboring devices, a central node device (such as a root node) or the management device may be used to determine a piece of arrangement information based on an association relationship or a network topology of the devices in the network, a packet sending priority of each device, traffic of each device, and the like. A device sending a packet and a device receiving the packet in a slot may be determined based on the arrangement information. For example, the arrangement information may be shown in the following table, and specifically means that in slot 1, a device 1 sends a packet to a device 2, and so on.

| Slot | Slot 1 | Slot 2 | Slot 3 | Slot 4 | ... |
|---|---|---|---|---|---|
| Packet sender | Device 1 | Device 3 | Device 2 | Device 2 | ... |
| Packet receiver | Device 2 | Device 2 | Management device | Device 1 | ... |

Based on the arrangement information, whether the packet receiver in the current slot is an intelligent terminal is determined. If so, it indicates that there is a packet sent to the intelligent terminal in the current slot. Because the intelligent terminal may have a plurality of receiving queues, it is further necessary to determine which receiving queue corresponding to the slot may receive the packet. Therefore, whether the packet sender in the current slot is the device corresponding to the MAC address in the target queue may be determined. If yes, the packet may be received in the target receiving queue in the slot, that is, it is determined that the target receiving queue meets the scheduling condition.

When the device corresponding to the MAC address of the packet sender is the packet sender in the current slot and the intelligent terminal is the packet receiver in the current slot, it is determined, based on the arrangement information of the current slot, that the target receiving queue meets the scheduling condition.

During scheduling of receiving queues, each receiving queue has its corresponding scheduling time, and a quantity of packets that are sent by the peer device and that can be received within the preset scheduling time is limited. Therefore, if all the packets from the peer device are not received in the target receiving queue in a scheduling period, the packets sent by the peer device may continue to be received by using the corresponding wireless antenna when the target receiving queue meets the scheduling condition again in a next scheduling period, and so on, until all the packets from the peer device are received after a plurality of periods of reception.

In a solution provided in this embodiment of this application, a plurality of omnidirectional antennas and at least one directional antenna are configured in an intelligent terminal, and P1 as a relay node determines, based on arrangement information of a current slot, whether P1 needs to receive a packet; when determining that the packet needs to be received, first obtains a MAC address of a packet sender; then determines, based on a preconfigured third mapping relationship between a MAC address and a receiving queue, a target receiving queue for receiving the packet; then waits for scheduling of the target receiving queue, and when determining, based on a calculated time slice index value or the arrangement information, that the target receiving queue is scheduled, determines, based on a fourth mapping relationship between a receiving queue and a wireless antenna, a target wireless antenna corresponding to the target receiving queue; and finally, uses the target wireless antenna to receive the packet sent by the packet sender.

In the foregoing solution, a mapping relationship is established between a MAC address, a receiving queue, and a wireless antenna, and the packet is received by scheduling the queue and using the wireless antenna matching the target receiving queue. This is conducive to accurate reception of the packet, improves signal quality in wireless transmission, and improves stability of wireless transmission.

In this embodiment of this application, practically, it may be understood that any IPC device has the need to receive a packet, and there may be more than one source MAC address of a packet to be received by the IPC device. In addition, during construction of a multi-cascade network topology, an IPC device originally used only to collect video data may also become a relay node and needs to receive packets sent by a plurality of neighboring devices. Therefore, to facilitate application in a multi-level cascade scenario, any IPC device can use the packet receiving method in the foregoing embodiment to receive a packet, and is not limited to acting as a relay node.

Figure 11:
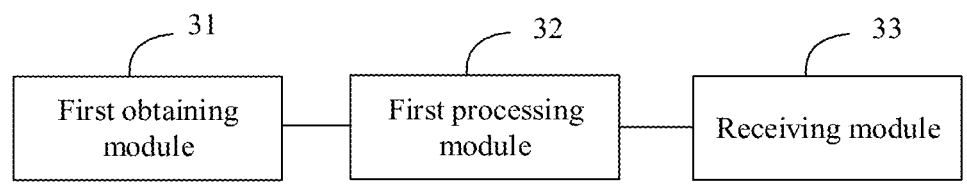
FIG. 11 is a schematic diagram of a structure of a packet receiving apparatus according to an embodiment of this application.

FIG. 11 is a schematic diagram of a structure of a packet receiving apparatus according to an embodiment of this application. The apparatus is located in an intelligent terminal having a wireless communication function. The intelligent terminal is provided with a plurality of wireless antennas, and the plurality of wireless antennas include an omnidirectional antenna and at least one directional antenna. As shown in FIG. 11, the apparatus includes a first obtaining module 31, a first processing module 32, and a receiving module 33.

The first obtaining module 31 is configured to obtain a MAC address of a packet sender.

The first processing module 32 is configured to determine, based on a known mapping relationship between a MAC address and a wireless antenna, a target wireless antenna corresponding to the MAC address, where the mapping relationship is configured based on an orientation relationship between the intelligent terminal and different neighboring devices, the different neighboring devices include other intelligent terminals and/or a management device, the management device is configured to store data collected by each intelligent terminal, and the target wireless antenna is one of the plurality of wireless antennas.

The receiving module 33 is configured to receive, by using the target wireless antenna, a packet sent by the packet sender.

Optionally, the first processing module 32 is further configured to: when no mapping relationship corresponding to the MAC address exists, determine that the target wireless antenna corresponding to the MAC address is the omnidirectional antenna, to receive, by using the omnidirectional antenna, the packet sent by the packet sender; feed back a response packet to the packet sender by using a target directional antenna, where the packet sender is one of the different neighboring devices, and the target directional antenna is one of the at least one directional antenna; and update a correspondence between the MAC address and the target directional antenna into the mapping relationship.

Optionally, the first processing module 32 is further configured to: determine, based on a preset third mapping relationship between a MAC address and a receiving queue, a target receiving queue corresponding to the MAC address; and if the target receiving queue meets a scheduling condition, determine, based on a preset fourth mapping relationship between a receiving queue and a wireless antenna, the target wireless antenna corresponding to the target receiving queue, where the mapping relationship includes the third mapping relationship and the fourth mapping relationship.

Optionally, the first processing module 32 is further configured to: generate a timing signal at an interval of a preset time slice length; determine, based on a result of a modulo operation between a current time of generating the timing signal and a specified scheduling period, a target time slice index value in the scheduling period, where duration of the scheduling period is an integer multiple of the preset time slice length, and a quantity of queues is less than or equal to a quantity of time slices included in the scheduling period; determine, based on a preset correspondence between a queue identifier and a time slice index value in the scheduling period, a queue corresponding to the target time slice index value; and if the determined queue is the target receiving queue, determine that the target receiving queue meets the scheduling condition.

Optionally, the first processing module 32 is further configured to: obtain arrangement information of the intelligent terminal and the different neighboring devices, where the arrangement information is used to identify a packet sender and a packet receiver corresponding to each slot, and the packet sender and the packet receiver are respectively one of the intelligent terminal and the different neighboring devices; and when a device corresponding to the MAC address is the packet sender and the intelligent terminal is the packet receiver, determine, based on the arrangement information, that the target receiving queue meets the scheduling condition.

The apparatus shown in FIG. 11 may perform the steps described in the foregoing embodiment of the packet receiving method. For the detailed execution process and technical effect, refer to descriptions in the foregoing embodiment of the packet receiving method. Details are not described herein again.

Figure 9:
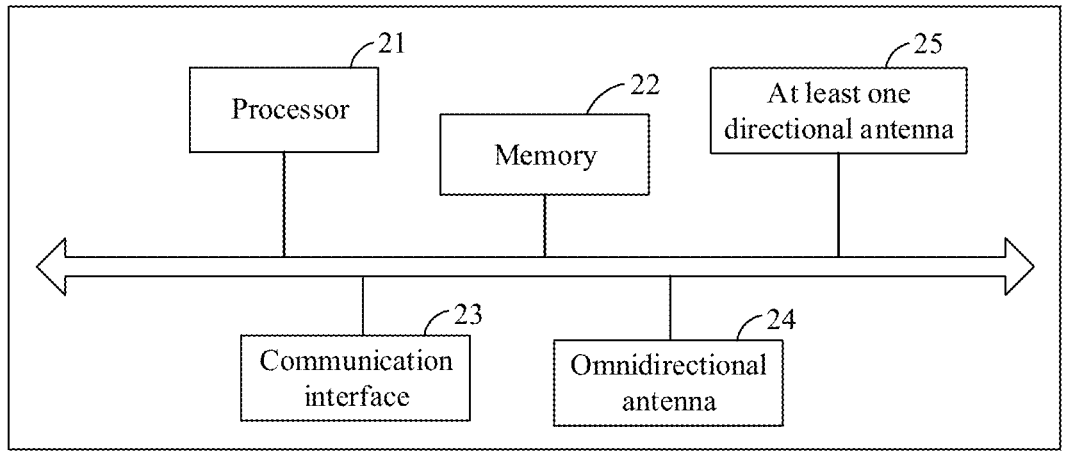
FIG. 9 is a schematic diagram of a structure of an intelligent terminal corresponding to the packet sending apparatus provided in the embodiment shown in FIG. 8 or a packet receiving apparatus provided in an embodiment shown in FIG. 11.

In a possible design, the structure of the packet sending apparatus shown in FIG. 8 and the structure of the packet receiving apparatus shown in FIG. 11 may be respectively implemented as an intelligent terminal. As shown in FIG. 9, the intelligent terminal may include a processor 21, a memory 22, a communication interface 23, an omnidirectional antenna 24, and at least one directional antenna 25. The memory 22 stores executable code. When the executable code is executed by the processor 21, the processor 21 is enabled to implement at least the packet sending method and the packet receiving method provided in the foregoing embodiments.

In addition, an embodiment of this application provides a non-transitory machine-readable storage medium. The non-transitory machine-readable storage medium stores executable code. When the executable code is executed by a processor of an electronic device, the processor may be enabled to implement at least the packet sending method and the packet receiving method provided in the foregoing embodiments.

An embodiment of this application further provides a packet processing system. The system includes the packet sending apparatus shown in FIG. 8 and the packet receiving apparatus shown in FIG. 11. The packet sending apparatus may implement the packet sending method provided in the foregoing embodiments. The packet receiving apparatus may implement the packet receiving method provided in the foregoing embodiments.

The memory may include a random access memory (RAM), or may include a non-volatile memory (NVM), for example, at least one disk memory. Optionally, the memory may also be a storage apparatus located away from the processor.

The processor may be a general purpose processor, including a central processing unit (CPU), a network processor (NP), or the like; or may be a digital signal processor (DSP), an application-specific integrated circuit (ASIC), a field-programmable gate array (FPGA), or another programmable logic device, a discrete gate or transistor logic device, or a discrete hardware component.

Correspondingly, an embodiment of this application further provides a computer-readable storage medium. The computer-readable storage medium stores instructions. When the instructions run on a computer, the computer is enabled to perform the method in any one of the foregoing embodiments.

This application is described with reference to the flowcharts and/or block diagrams of the method, the device (system), and the computer program product based on the embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

Alternatively, these computer program instructions may be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Although optional embodiments of this application have been described, persons skilled in the art may make additional changes and modifications to these embodiments once they learn the basic inventive concept. Therefore, the appended claims shall be construed to cover the optional embodiments and all changes and modifications falling within the scope of this application.

Apparently, a person skilled in the art may make various changes and variations to the embodiments of this application without departing from the spirit and scope of this application. Therefore, this application is intended to cover the changes and variations provided that the changes and variations of the embodiments of this application fall within the scope of the claims of this application or equivalent technologies thereof.

What is claimed is:

1. A packet sending method, applied to an intelligent terminal provided with a plurality of wireless antennas comprising at least one directional antenna, the method comprising:

obtaining a destination MAC address of a to-be-sent packet;

determining, based on a mapping relationship between the destination MAC address and a wireless antenna from the at least one directional antenna, the wireless antenna as a target wireless antenna, wherein the mapping relationship is configured based on an orientation relationship between the intelligent terminal and one of neighboring devices of the intelligent terminal; and sending the to-be-sent packet by using the target wireless antenna;

wherein the determining, based on the mapping relationship between the destination MAC address and the wireless antenna, the wireless antenna as the target wireless antenna, comprises:

determining, based on a preset first mapping relationship between the destination MAC address, a packet type, and a queue, the queue as a target queue corresponding to the destination MAC address;

storing the to-be-sent packet in the target queue; and when the target queue meets a scheduling condition, determining, based on a preset second mapping relationship between the target queue and the wireless antenna, the wireless antenna as the target wireless antenna corresponding to the target queue, wherein the mapping relationship comprises the preset first mapping relationship and the preset second mapping relationship.

2. The method according to claim 1, wherein the plurality of wireless antennas further comprises an omnidirectional antenna, the method further comprises:

when the mapping relationship corresponding to the destination MAC address does not exist, determining the omnidirectional antenna as the target wireless antenna, for broadcasting the to-be-sent packet.

3. The method according to claim 2, wherein after the sending the to-be-sent packet by using the target wireless antenna, the method further comprises:

receiving, by using a target directional antenna from the plurality of wireless antennas, a broadcast response packet transmitted by a target device from the neighboring devices, wherein the destination MAC address is a MAC address of the target device; and establishing, based on the broadcast response packet, a mapping relationship between the destination MAC address and the target directional antenna.

4. The method according to claim 1, wherein the plurality of wireless antennas further comprises an omnidirectional antenna, and the mapping relationship indicates a correspondence between a packet type, the destination MAC address, and the target wireless antenna; and the determining, based on the mapping relationship between the destination MAC address and the wireless antenna, the wireless antenna as the target wireless antenna, comprises:

in response to the to-be-sent packet being a broadcast packet, determining the omnidirectional antenna as the target wireless antenna; or in response to the to-be-sent packet being a unicast packet, determining the wireless antenna corresponding to the destination MAC address as the target wireless antenna.

5. The method according to claim 1, wherein before the when the target queue meets the scheduling condition, determining, based on the preset second mapping relationship between the target queue and the wireless antenna, the wireless antenna as the target wireless antenna corresponding to the target queue, the method further comprises:

determining, based on a result of a modulo operation between an instant of generating a current timing signal and a specified scheduling period, a target time slice index value for the current timing signal, wherein the timing signal is generated at an interval of a preset time slice length, a length of the scheduling period is an integer multiple of the preset time slice length, and a quantity of queues transmitted in the scheduling period is less than or equal to a quantity of time slices comprised in the scheduling period;

determining, based on a preset correspondence between a queue identifier of a queue and the time slice index value in the scheduling period, the queue corresponding to the target time slice index value; and when the determined queue is the target queue, determining that the target queue meets the scheduling condition.

6. The method according to claim 1, wherein the method further comprises:

obtaining arrangement information of the intelligent terminal and the one of the neighboring devices, wherein the arrangement information is used to identify a packet sender and a packet receiver corresponding to each slot, and the packet sender and the packet receiver are respectively one of the intelligent terminal and the one of the neighboring devices; and when the one of the neighboring devices corresponding to the destination MAC address is the packet receiver and the intelligent terminal is the packet sender, determining, based on the arrangement information, that the target queue meets the scheduling condition.

7. The method according to claim 1, wherein the neighboring devices comprise other intelligent terminals and/or a management device, the management device is configured to store data collected by the intelligent terminal and/or the other intelligent terminals, and the wireless antenna is one of the at least one directional antenna.

8. An intelligent terminal, comprising a memory, a processor, a communication interface, an omnidirectional antenna, and at least one directional antenna, wherein the memory stores executable code, and when the executable code is executed by the processor, the processor is enabled to perform the packet sending method according to claim 1.

9. A non-transitory machine-readable storage medium, wherein the non-transitory machine-readable storage medium stores executable code, and when the executable code is executed by a processor of an electronic device, the processor is enabled to perform the packet sending method according to claim 1.

10. A packet receiving method, applied to an intelligent terminal provided with a plurality of wireless antennas comprising at least one directional antenna, the method comprising:

obtaining a MAC address of a packet sender;

determining, based on a mapping relationship between the destination MAC address and a wireless antenna from the at least one directional antenna, the wireless antenna as a target wireless antenna, wherein the mapping relationship is configured based on an orientation relationship between the intelligent terminal and one of neighboring devices of the intelligent terminal; and receiving, by using the target wireless antenna, a packet sent by the packet sender;

wherein the determining, based on the mapping relationship between the MAC address and the wireless antenna, the wireless antenna as the target wireless antenna, comprises:

determining, based on a preset third mapping relationship between the MAC address and a receiving queue, a target receiving queue corresponding to the MAC address; and when the target receiving queue meets a scheduling condition, determining, based on a preset fourth mapping relationship between the receiving queue and the wireless antenna, the target wireless antenna corresponding to the target receiving queue, wherein the mapping relationship comprises the preset third mapping relationship and the preset fourth mapping relationship.

11. The method according to claim 10, wherein the plurality of wireless antennas further comprises an omnidirectional antenna, the method further comprises:

when the mapping relationship corresponding to the MAC address does not exists, determining the omnidirectional antenna as the target wireless antenna for receiving the packet sent by the packet sender.

12. The method according to claim 11, wherein after the receiving, by using the target wireless antenna, a packet sent by the packet sender, the method further comprises:

feeding back a response packet to the packet sender by using a target directional antenna, wherein the packet sender is one of the neighboring devices, and the target directional antenna is one of the at least one directional antenna; and establishing a mapping relationship between the MAC address and the target directional antenna.

13. The method according to claim 10, wherein before when the target receiving queue meets a scheduling condition, determining, based on a preset fourth mapping relationship between the receiving queue and the wireless antenna, the target wireless antenna corresponding to the target receiving queue, wherein the mapping relationship comprises the preset third mapping relationship and the preset fourth mapping relationship, the method further comprises:

determining, based on a result of a modulo operation between an instant of generating a current timing signal and a specified scheduling period, a target time slice index value for the current timing signal, wherein the timing signal is generated at an interval of a preset time slice length, a length of the scheduling period is an integer multiple of the preset time slice length, and a quantity of queues transmitted in the scheduling period is less than or equal to a quantity of time slices comprised in the scheduling period;

determining, based on a preset correspondence between a queue identifier of a queue and the time slice index value in the scheduling period, the queue corresponding to the target time slice index value; and when the determined queue is the target receiving queue, determining that the target receiving queue meets the scheduling condition.

14. The method according to claim 10, wherein the method further comprises:

obtaining arrangement information of the intelligent terminal and the one of the neighboring devices, wherein the arrangement information is used to identify a packet sender and a packet receiver corresponding to each slot, and the packet sender and the packet receiver are respectively one of the intelligent terminal and the one of the neighboring devices; and when the one of the neighboring devices corresponding to the MAC address is the packet sender and the intelligent terminal is the packet receiver, determining, based on the arrangement information, that the target receiving queue meets the scheduling condition.

15. The method according to claim 10, wherein the neighboring devices comprise other intelligent terminals and/or a management device, the management device is configured to store data collected by the intelligent terminal and/or the other intelligent terminals, and the wireless antenna is one of the at least one directional antenna.

16. An intelligent terminal, comprising a memory, a processor, a communication interface, an omnidirectional antenna, and at least one directional antenna, wherein the memory stores executable code, and when the executable code is executed by the processor, the processor is enabled to perform the packet receiving method according to claim 10.

17. A non-transitory machine-readable storage medium, wherein the non-transitory machine-readable storage medium stores executable code, and when the executable code is executed by a processor of an electronic device, the processor is enabled to perform the packet receiving method according to claim 10.

* * * * *